United States Patent
Sahara

(10) Patent No.: US 9,253,650 B2
(45) Date of Patent: Feb. 2, 2016

(54) RADIO BASE STATION AND COMMUNICATION CONTROL METHOD INCLUDING UPLINK RESOURCE REALLOCATION

(75) Inventor: Tooru Sahara, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/235,066

(22) PCT Filed: Jul. 25, 2012

(86) PCT No.: PCT/JP2012/068815
§ 371 (c)(1),
(2), (4) Date: Jan. 26, 2014

(87) PCT Pub. No.: WO2013/015310
PCT Pub. Date: Jan. 31, 2013

(65) Prior Publication Data
US 2014/0169241 A1    Jun. 19, 2014

(30) Foreign Application Priority Data
Jul. 26, 2011    (JP) ................................. 2011-163736

(51) Int. Cl.
*H04L 12/28*    (2006.01)
*H04W 16/28*    (2009.01)
*H04B 7/06*    (2006.01)
*H04W 72/04*    (2009.01)
*H04L 5/00*    (2006.01)
(Continued)

(52) U.S. Cl.
CPC ............. *H04W 16/28* (2013.01); *H04B 7/0617* (2013.01); *H04L 5/00* (2013.01); *H04W 72/046* (2013.01); *H04W 72/0413* (2013.01); *H04W 88/08* (2013.01)

(58) Field of Classification Search
CPC .............. H04L 5/0023; H04L 27/2601; H04L 27/2647; H04L 25/0204; H04B 7/0421
USPC .......................... 370/252, 329, 430, 437, 478
See application file for complete search history.

(56) References Cited

U.S. PATENT DOCUMENTS

2003/0123559 A1*   7/2003  Classon et al. ................ 375/260
2006/0281494 A1*  12/2006  Wilson et al. .............. 455/562.1
2007/0135052 A1*   6/2007  Park et al. ..................... 455/63.1

(Continued)

FOREIGN PATENT DOCUMENTS

| JP | 2005-341406 A | 12/2005 |
| JP | 2008-219625 A | 9/2008 |
| JP | 2008-301359 A | 12/2008 |

OTHER PUBLICATIONS

International Search Report; PCT/JP2012/068815; Oct. 2, 2012.
(Continued)

*Primary Examiner* — John Pezzlo
(74) *Attorney, Agent, or Firm* — Studebaker & Brackett PC

(57) ABSTRACT

An eNB assigns, to a UE, a pair of a PDSCH resource and a PUSCH resource that overlaps, in frequency band, with the PDSCH resource; and derives antenna weight that should be applied to the PDSCH resource, on the basis of a DMRS transmitted from the UE by using the PUSCH resource. When the assignment of the PUSCH is changed to another UE, the eNB derives the antenna weight, on the basis of a past uplink reference signal transmitted from the UE in a past time zone earlier than the PUSCH resource and in a frequency band overlapping with the frequency band of the PDSCH resource.

7 Claims, 12 Drawing Sheets

(51) Int. Cl.
*H04J 1/16* (2006.01)
*H04W 88/08* (2009.01)

(56) References Cited

U.S. PATENT DOCUMENTS

| | | | |
|---|---|---|---|
| 2008/0056390 A1* | 3/2008 | Rainbolt et al. | 375/260 |
| 2008/0113622 A1* | 5/2008 | Lee et al. | 455/62 |
| 2008/0232518 A1* | 9/2008 | Kim et al. | 375/345 |
| 2009/0296649 A1* | 12/2009 | Yagi | 370/330 |
| 2010/0046460 A1* | 2/2010 | Kwak et al. | 370/329 |
| 2010/0202420 A1* | 8/2010 | Jersenius et al. | 370/337 |
| 2010/0265853 A1* | 10/2010 | Song et al. | 370/280 |
| 2010/0291959 A1* | 11/2010 | Inaida | 455/513 |
| 2011/0134848 A1* | 6/2011 | Tamaki | 370/328 |
| 2011/0149814 A1* | 6/2011 | Mottier | 370/280 |
| 2012/0207125 A1* | 8/2012 | Takamatsu | H04W 72/044 370/330 |

OTHER PUBLICATIONS

3GPP TS 36.211 V8.7.0 (May 2009); 3rd Generation Partnership Project; Technical Specification Group Radio Access Network; Evolved Universal Terrestrial Radio Access (E-UTRA); Physical Channels and Modulation (Release 8).

* cited by examiner

RADIO BASE STATION AND COMMUNICATION CONTROL METHOD INCLUDING UPLINK RESOURCE REALLOCATION

TECHNICAL FIELD

The present invention relates to a radio base station that performs radio communication by using adaptive array control in a TDD radio communication system, and relates also to a communication control method therefor.

BACKGROUND ART

In a radio communication system (LTE system) that complies with LTE (Long Term Evolution) with its standards currently being discussed in 3GPP (Third Generation Partnership Project), a radio base station assigns a radio resource in radio communication between the radio base station and a radio terminal (for example, see Non Patent Literature 1).

Further, in an LTE system according to a Time Division Duplex (TDD) scheme (hereinafter, referred to as "TD-LTE system"), in order to increase a frequency utilization efficiency and improve quality of radio communication, it is considered that adaptive array control using an array antenna is introduced to the radio base station.

The adaptive array control includes a beamforming in which the peak of a directivity pattern of the array antenna is oriented to a radio terminal subordinate to the radio base station and a null steering in which the null of the directivity pattern of the array antenna is oriented to a radio terminal subordinate to another radio base station.

CITATION LIST

Non Patent Literature

Non Patent Literature 1: 3GPP TS 36.211 V8.7.0 "Physical Channels and Modulation", May 2009

SUMMARY OF THE INVENTION

In the TD-LTE system, it is supposed to realize the adaptive array control according to the following procedure.

The radio base station assigns a pair of an uplink radio resource for transmitting an uplink reference signal and a downlink radio resource that overlaps, in a frequency band, with the uplink radio resource, to the radio terminal. Then, on the basis of the uplink reference signal received from the radio terminal, an antenna weight is calculated so that the peak of a directivity pattern is oriented to the radio terminal, whereby the beamforming is performed.

On the other hand, another radio base station performs a null steering by calculating, on the basis of the uplink reference signal received from the radio terminal, an antenna weight so that the null of a directivity pattern is oriented to the radio terminal.

In this way, the uplink radio resource to be used in calculating antenna weight and the downlink radio resource to which the antenna weight is applied are assigned symmetrically for each radio terminal, and thereby, the adaptive array control in the TD-LTE system is realized.

However, in such a method, the uplink radio resource is consumed to calculate the antenna weight. Thus, when transmission of uplink data (uplink user data) from a radio terminal is necessary, a situation in which an uplink radio resource for uplink data transmission cannot be assigned to the radio terminal may occur. Therefore, there is a problem that uplink throughput is reduced.

Therefore, an object of the present invention is to provide a radio base station capable of enabling adaptive array control to be favorably functioned while restraining reduction of uplink throughput in a TDD radio communication system, and to provide a communication control method therefor.

In order to solve the aforementioned problem, the present invention has following features.

The feature of a radio base station according to the present invention is summarized as follows. A radio base station (eNB 100-1) that performs radio communication by using adaptive array control, in a TDD radio communication system (TD-LTE system 10), comprises: a resource assignment unit (resource assignment unit 121) that assigns, to a radio terminal, a pair of a downlink radio resource (PDSCH resource) and an uplink radio resource (PUSCH resource) that overlaps, in frequency band, with the downlink radio resource; and a weight derivation unit (weight derivation unit 122) that derives antenna weight (downlink weight) that should be applied to the downlink radio resource, on the basis of an uplink reference signal (DMRS) transmitted from the radio terminal by using the uplink radio resource, wherein the resource assignment unit changes the assignment of the uplink radio resource constituting the pair to another radio terminal in response to occurrence of necessity to transmit uplink data by the another radio terminal, and when the assignment of the uplink radio resource constituting the pair is changed to the another radio terminal, the weight derivation unit derives the antenna weight, on the basis of a past uplink reference signal transmitted from the radio terminal in a past time zone earlier than the uplink radio resource constituting the pair and in a frequency band overlapping with the frequency band of the downlink radio resource, or a neighboring uplink reference signal transmitted from the radio terminal in a time zone of the uplink radio resource constituting the pair and in a frequency band adjacent to the frequency band of the downlink radio resource. Here, "derivation" includes not only "calculation" of antenna weight, but also "acquisition" of antenna weight from a storage unit (memory).

According to such a feature, in a case where the uplink radio resource to be used in the derivation of the antenna weight and the downlink radio resource to which the antenna weight is applied are assigned symmetrically for the radio terminal, when transmission of uplink data (uplink user data) from another radio terminal is necessary, the other radio terminal can transmit the uplink data by changing the assignment of the uplink radio resource to the other radio terminal, and thus, it is possible to restrain reduction of uplink throughput.

Further, even when the assignment of the uplink radio resource is changed to the other radio terminal, it is possible to ensure the accuracy of antenna weight by deriving the antenna weight on the basis of the past uplink reference signal or the neighboring uplink reference signal, and thus, it is possible to enable the adaptive array control to be favorably functioned.

Therefore, according to the above-described feature, in a TDD radio communication system, adaptive array control can be favorably functioned while restraining reduction of uplink throughput.

Another feature of the radio base station according to the present invention is summarized as follows. In the aforementioned feature, the resource assignment unit further can assign a data-dedicated uplink radio resource dedicated to uplink data.

Another feature of the radio base station according to the present invention is summarized as follows. In the aforementioned feature, the resource assignment unit changes the assignment of the uplink radio resource constituting the pair to the another radio terminal, when all the data-dedicated uplink radio resources have been assigned and when it becomes necessary to transmit uplink data by the another radio terminal.

Another feature of the radio base station according to the present invention is summarized as follows. In the aforementioned feature, the radio base station further comprises a movement speed acquisition unit that acquires information related to movement speed of the radio terminal, wherein when the assignment of the uplink radio resource constituting the pair is changed to the another radio terminal and when it is assumed that the movement speed of the radio terminal is high, the weight derivation unit derives the antenna weight on the basis of the neighboring uplink reference signal.

Another feature of the radio base station according to the present invention is summarized as follows. In the aforementioned feature, the radio base station further comprises a frequency selective fading acquisition unit that acquires information related to frequency selective fading between the radio terminal and the radio base station, wherein when the assignment of the uplink radio resource constituting the pair is changed to the another radio terminal and when it is assumed that the frequency selective fading between the radio terminal and the radio base station is significant, the weight derivation unit derives the antenna weight on the basis of the past uplink reference signal.

According to such a feature, when the frequency selective fading between the radio terminal and the radio base station is significant, the accuracy of the antenna weight derived on the basis of the neighboring uplink reference signal becomes low, and thus, it is possible to ensure the accuracy of antenna weight by deriving the antenna weight on the basis of the past uplink reference signal. Therefore, it is possible to enable the adaptive array control to be favorably functioned.

The feature of a communication control method according to the present invention is summarized as follows. A communication control method in a radio base station that performs radio communication by using adaptive array control, in a TDD radio communication system, comprises: a resource assignment step of assigning, to a radio terminal, a pair of a downlink radio resource and an uplink radio resource that overlaps, in frequency band, with the downlink radio resource; and a weight derivation step of deriving antenna weight that should be applied to the downlink radio resource, on the basis of an uplink reference signal transmitted from the radio terminal by using the uplink radio resource, wherein in the resource assignment step, the radio base station changes the assignment of the uplink radio resource constituting the pair to another radio terminal in response to occurrence of necessity to transmit uplink data by the other radio terminal, and when the radio base station changes the assignment of the uplink radio resource constituting the pair to the another radio terminal, in the weight derivation step, the radio base station derives the antenna weight, on the basis of a past uplink reference signal transmitted from the radio terminal in a past time zone earlier than the uplink radio resource constituting the pair and in a frequency band overlapping with the frequency band of the downlink radio resource, or a neighboring uplink reference signal transmitted from the radio terminal in a time zone of the uplink radio resource constituting the pair and in a frequency band adjacent to the frequency band of the downlink radio resource.

DESCRIPTION OF THE EMBODIMENT

Figure 1:
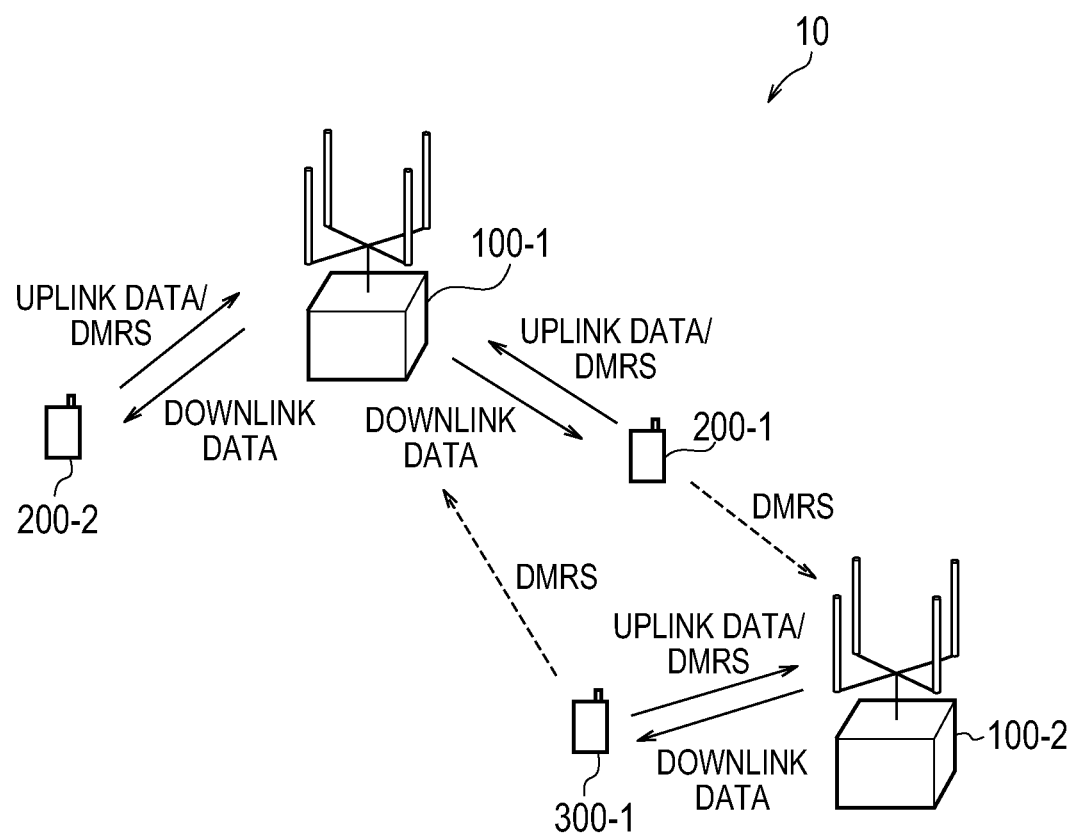
FIG. 1 is a configuration diagram of a TD-LTE system according to the first embodiment to the fifth embodiment.

With reference to the drawings, an embodiment of the present invention will be described. In the drawings of the following embodiment, the same or similar reference signs are applied to the same or similar portions.

(1) First Embodiment (1.1) Configuration of Radio Communication System

FIG. 1 is a configuration diagram of a TD-LTE system 10 according to the present embodiment. In the TD-LTE system 10, a TDD scheme is adopted as a duplex scheme. Further, in the TD-LTE system 10, OFDMA (Orthogonal Frequency Division Multiplexing Access) is adopted in Downlink (DL) radio communication and SC-FDMA (Single Carrier Frequency Division Multiple Access) is adopted in Uplink (UL) radio communication.

As shown in FIG. 1, the TD-LTE system 10 according to the present embodiment includes: a radio base station (eNB: evolved NodeB) 100-1; eNB 100-2 provided adjacently to the eNB 100-1; a radio terminal (UE: User Equipment) 200-1 subordinate to the eNB 100-1; UE 200-2 subordinate to the eNB 100-1; and UE 300-1 subordinate to the eNB 100-2.

It is noted that two UEs 200 subordinate to the eNB 100-1 are shown; however, in reality, more UEs 200 (UE 200-3, UE 200-4, . . . ) are subordinate to the eNB 100-1. Further, one UE 300-1 subordinate to the eNB 100-2 is shown; however, in reality, more UEs 300 (UE 300-2, UE 300-3, . . . ) are subordinate to the eNB 100-2.

Each UE 200 uses a cell formed by the eNB 100-1 as a serving cell, and a radio resource is assigned by the eNB 100-1. Each UE 300 uses a cell formed by the eNB 100-2 as a serving cell, and a radio resource is assigned by the eNB 100-2. It is noted that the radio resource is configured by a resource block (RB) including 12 successive subcarriers is one unit.

In particular, each eNB 100 assigns a PUCCH (Physical Uplink Control Channel) resource for uplink control data; a PUSCH (Physical Uplink Shared Channel) resource for uplink user data; a PDCCH (Physical Downlink Control Channel) resource for downlink control data; and a PDSCH (Physical Downlink Shared Channel) resource for downlink user data, to a subordinate UE. The PUCCH resource, the PUSCH resource, the PDCCH resource, and the PDSCH resource are configured by one or a plurality of RBs, respectively.

Each UE 200 and each UE 300 transmit at least one of uplink user data and a demodulation reference signal (DMRS) by using the PUSCH resource assigned from a serving cell. The DMRS is a known signal sequence for synchronous detection of PUSCH. Further, each UE 200 and each UE 300 transmit a sounding reference signal (SRS) in a predetermined cycle. The SRS is a known signal sequence for measuring uplink channel quality. Furthermore, each UE 200 and each UE 300 transmit a PUSCH assignment request to the serving cell, when it is necessary to transmit uplink user data.

In the TD-LTE system 10, adaptive array control using an array antenna is introduced to each eNB 100.

The eNB 100-1 assigns a pair of a PDSCH resource and a PUSCH resource that overlaps, in frequency band, with the PDSCH resource, to each UE 200. The eNB 100-1 calculates antenna weight on the basis of the DMRS transmitted from each UE 200 by using the PUSCH resource, thereby to perform beamforming in which the peak of the directivity pattern of the array antenna is oriented to each UE 200. Further, the eNB 100-1 calculates antenna weight on the basis of the DMRS received from each UE 300 subordinate to the eNB 100-2 thereby to perform null steering in which the null of the directivity pattern of the array antenna is oriented to each UE 300. The eNB 100-1 transmits downlink user data by using the PDSCH resource according to such directivity pattern. The antenna weight includes uplink weight that is antenna weight for uplink, and downlink weight that is antenna weight for downlink.

Similarly, the eNB 100-2 assigns a pair of a PDSCH resource and a PUSCH resource that overlaps, in frequency band, with the PDSCH resource, to each UE 300. The eNB 100-2 calculates antenna weight on the basis of the DMRS transmitted from each UE 300 by using the PDSCH resource, thereby to perform the beamforming in which the peak of the directivity pattern of the array antenna is oriented to each UE 300. Further, the eNB 100-2 calculates antenna weight on the basis of the DMRS received from each UE 200 subordinate to the eNB 100-1 thereby to perform the null steering in which the null of the directivity pattern of the array antenna is oriented to each UE 200. The eNB 100-2 transmits downlink data by using the PDSCH resource according to such directivity pattern.

In this way, the PDSCH resource to be used in calculating the antenna weight and the PDSCH resource to which the antenna weight is applied are assigned symmetrically for each UE, and thereby, the adaptive array control in the TD-LTE system 10 is realized.

(1.2) Configuration of Radio Base Station

Figure 2:
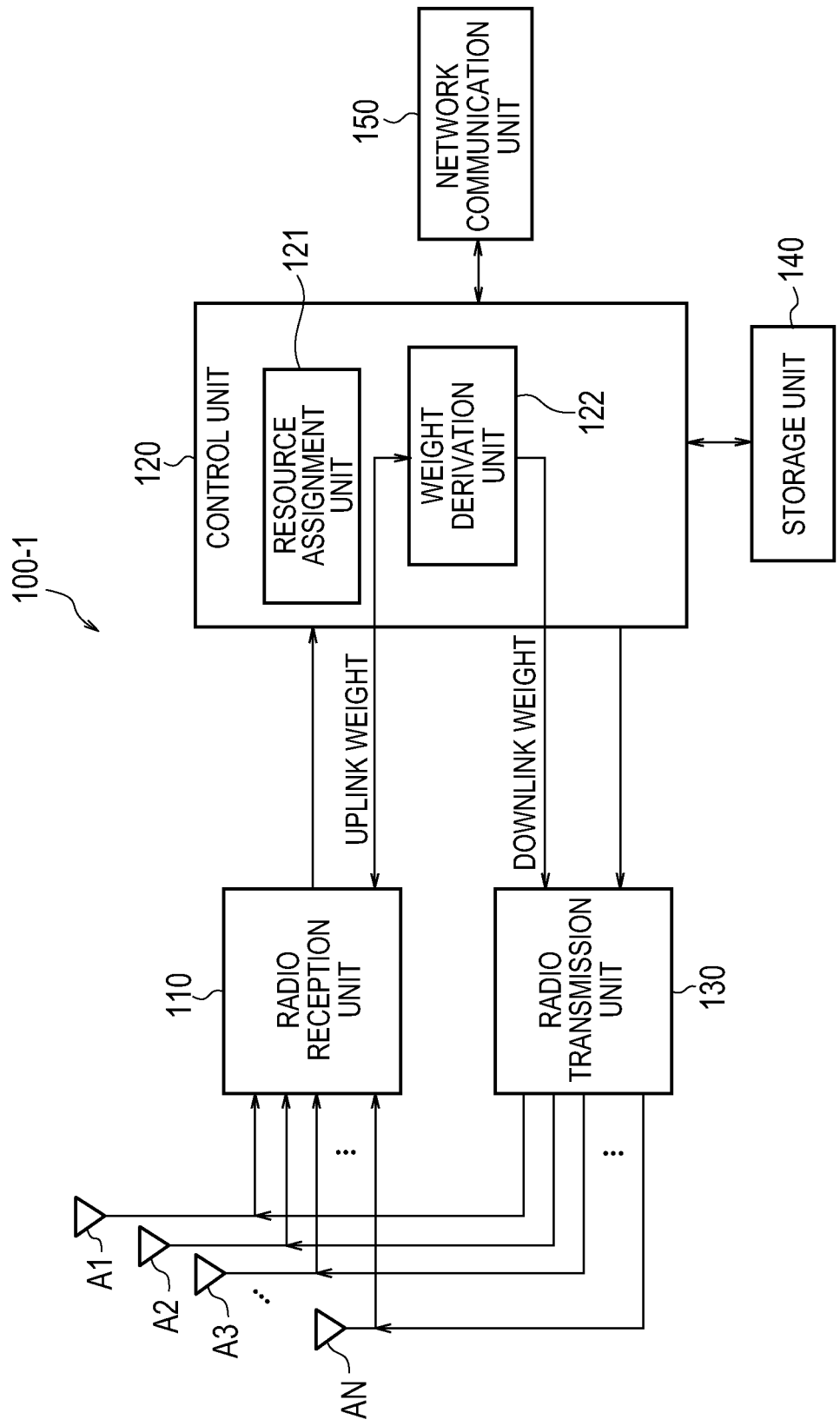
FIG. 2 is a block diagram of the eNB according to the first embodiment to the third embodiment.

FIG. 2 is a block diagram of the eNB 100-1 according to the present embodiment. The eNB 100-2 is configured similarly to the eNB 100-1, and thus, the configuration of the eNB 100-1 is described as a representative of each eNB 100.

As shown in FIG. 2, the eNB 100-1 includes a plurality of antenna elements A1 to AN, a radio reception unit 110, a control unit 120, a radio transmission unit 130, a storage unit 140, and a network communication unit 150.

The plurality of antenna elements A1 to AN configures the array antenna, and are used for transmitting and receiving a radio signal.

The radio reception unit 110 receives a reception signal for each of the plurality of antenna elements A1 to AN. The radio reception unit 110 receives the uplink weight from the control unit 120. The radio reception unit 110 performs a weighting process in which the reception signal for each of the plurality of antenna elements A1 to AN is multiplied by the uplink weight and then synthesized, and outputs the weighted reception signal to the control unit 120. Further, the radio reception unit 110 amplifies the reception signal, and converts (down-converts) the reception signal from a radio frequency (RF) band to a baseband (BB) band, for example.

The control unit 120 controls various functions of the eNB 100-1. The control unit 120 includes a resource assignment unit 121 and a weight derivation unit 122.

The resource assignment unit 121 assigns the radio resource to each UE 200 subordinate to the eNB 100-1. In particular, the resource assignment unit 121 assigns a SRS resource for SRS, a PUCCH resource, a PUSCH resource, a PDCCH resource, and a PDSCH resource, to each UE 200.

The resource assignment unit 121 determines whether uplink user data is generated on the basis of the PUSCH assignment request received by the radio reception unit 110, for each UE 200. In a case where uplink user data is generated, the resource assignment unit 121 assigns a PUSCH resource to the UE 200 that has transmitted the PUSCH assignment request. In contrast, to UE 200 in which uplink user data is not generated, a PUSCH resource that overlaps, in frequency band, with the PDSCH resource to be assigned to the UE 200 is assigned.

The resource assignment unit 121 assigns the PUCCH resource, the PUSCH resource, the PDCCH resource, and the PDSCH resource, for each subframe, and controls so that assignment information is notified to the UE 200 by PDCCH. It is noted that a specification does not allow an assignment of the SRS resource to be changed for each subframe. Thus, the resource assignment unit 121 notifies the UE 200 of an assignment parameter by signaling of an upper layer, only when it becomes necessary to set or change the assignment.

The weight derivation unit 122 derives the uplink weight and downlink weight on the basis of the DMRS received by the radio reception unit 110. In particular, the weight derivation unit 122 derives the uplink weight and downlink weight, for each RB, for orienting the peak toward the UE 200 subordinate to the eNB 100-1 and orienting the null toward UE subordinate to another eNB, on the basis of the DMRS from the UE 200 subordinate to the eNB 100-1 and the DMRS from the UE subordinate to the other eNB.

Upon deriving the downlink weight to be applied to the PDSCH resource of the UE 200, when a PUSCH resource of the UE 200 that overlaps, in frequency band, with the PDSCH resource exists, that is, when receiving the DMRS that overlaps, in frequency band, with the PDSCH resource, the weight derivation unit 122 calculates the downlink weight on the basis of the DMRS. Then, the weight derivation unit 122 outputs the calculated downlink weight to the radio transmission unit 130, and associates the downlink weight to frequency band information of the PUSCH resource (DMRS) and UE identification information and stores the downlink weight in the storage unit 140. In addition, the weight derivation unit 122 appropriately calculates the downlink weight on the basis of the SRS, and associates the downlink weight to frequency band information of the SRS and UE identification information and stores the downlink weight in the storage unit 140.

In contrast, upon deriving the downlink weight to be applied to the PDSCH resource of the UE 200, when a PUSCH resource of the UE 200 that overlaps, in frequency band, with the PDSCH resource does not exist, that is, when the assignment of the PUSCH resource is changed to another UE 200, the weight derivation unit 122 acquires the downlink weight on the basis of the past DMRS/SRS that overlaps, in frequency band, with the PDSCH resource from the storage unit 140.

The radio transmission unit 130 receives a transmission signal including downlink user data and downlink weight, from the control unit 120. The radio transmission unit 130 performs a weighting process in which the transmission signal is distributed to each of the plurality of antenna elements A1 to AN and each transmission signal is multiplied by the downlink weight. The radio transmission unit 130 outputs the weighted transmission signal to the plurality of antenna elements A1 to AN. Further, the radio transmission unit 130 amplifies the transmission signal, and converts (up-converts) of the transmission signal from the BB band to the RF band, for example.

The storage unit 140 stores various types of information to be used for the control by the control unit 120. In the present embodiment, the storage unit 140 stores the downlink weight calculated on the basis of the past DMRS/SRS.

The network communication unit 150 communicates with a core network (EPC: Evolved Packet Core) or with a neighboring eNB.

(1.3) Operation of Radio Base Station

Next, by using FIG. 3 to FIG. 6, an operation of the eNB 100-1 according to the present embodiment will be described. Hereinafter, an operation in which the eNB 100-1 assigns a resource to each UE 200 subordinate to the eNB 100-1 will be described. It is noted that the eNB 100-2 assigns a resource to each UE 300 subordinate to the eNB 100-2 in much the same way as the eNB 100-1.

(1.3.1) Configuration of Radio Frame

Figure 3:
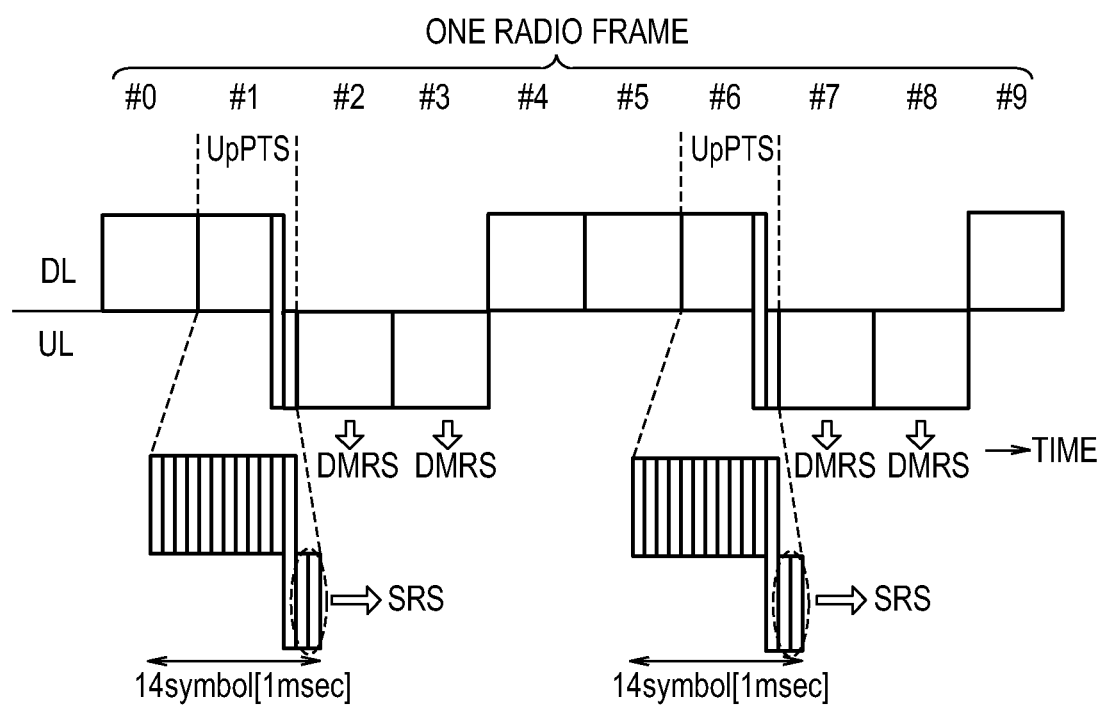
FIG. 3 is a configuration diagram of the radio frame used in the TD-LTE system according to the first embodiment to the fifth embodiment.

Firstly, by using FIG. 3, the configuration of a radio frame used in the TD-LTE system 10 will be described. FIG. 3 is a configuration diagram of the radio frame used in the TD-LTE system 10 according to the present embodiment. It is noted that as a specification, there are seven patterns defined for the radio frame configuration of a TDD scheme (that is, a configuration pattern of a subframe); one of these patterns will be described, as an example, in this case.

As shown in FIG. 3, one radio frame is configured by 10 subframes on a time axis. Each subframe has a time length of 1 msec, and is configured by two slots on a time axis. In addition, each subframe is configured by 14 symbols on a time axis. Further, each subframe is configured by about 50 RBs on a frequency axis.

A subframe #0, a subframe #4, a subframe #5, and a subframe #9 are downlink-dedicated subframes, respectively. In the downlink-dedicated subframe, a head portion is a control region used, on a time axis, as the PDCCH resource, and the remaining portion is a data region used as the PDSCH resource.

A subframe #2, a subframe #3, a subframe #7, and a subframe #8 are uplink-dedicated subframes, respectively. In the uplink-dedicated subframe, both ends are a control region, on a frequency axis, used as the PUSCH resource, and the remaining portion (central portion) is a data region used as the PUSCH resource. The DMRS is arranged at the fourth symbol of each slot included in the PUSCH resource. Accordingly, two DMRSs are transmitted per one subframe.

A subframe #1 and a subframe #6 are special subframes for switching an uplink and a downlink, respectively. The special subframe includes a downlink pilot time slot (DwPTS), a guard period (GP), and an uplink pilot time slot (UpPTS). For example, the DwPTS occupies a first symbol to an 11th symbol, the GP occupies a 12th symbol, and the UpPTS occupies 13th and 14th symbols. As a specification, there are a plurality of patterns defined for the special subframe configuration (that is, a symbol number of the DwPTS, the GP, and the UpPTS in the special subframe). However, it is noted that one of these patterns will be described as an example in the present embodiment.

In the present embodiment, the UpPTS is used for transmitting the SRS. The eNB 100-1 assigns each SRS resource included in the UpPTS, to each UE 200.

(1.3.2) Resource Assignment Operation and Downlink Weight Derivation Operation

Figure 4:
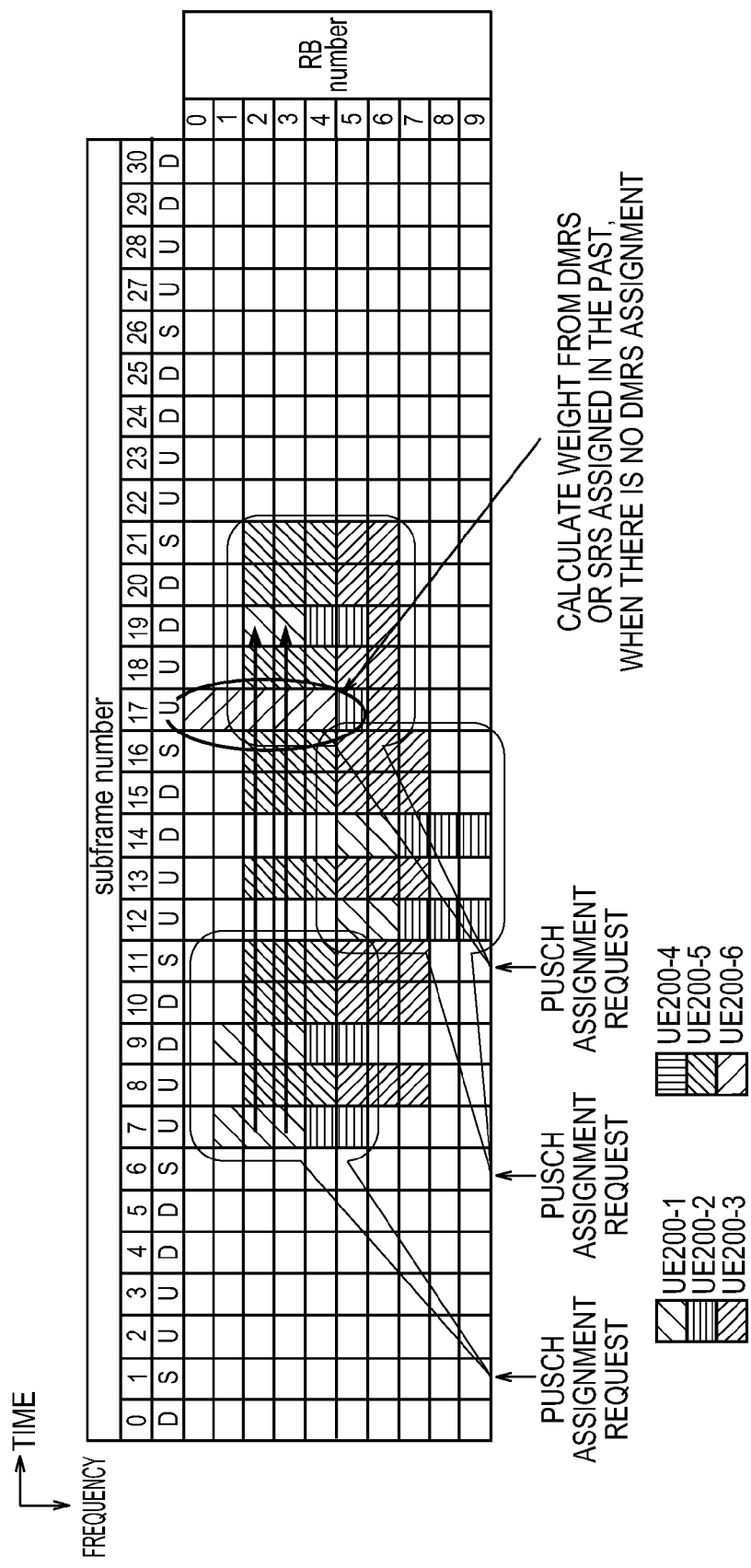
FIG. 4 is a diagram for describing the resource assignment operation and downlink weight derivation operation according to the first embodiment.

Next, by using FIG. 4, a resource assignment operation and a downlink weight derivation operation according to the present embodiment will be described. FIG. 4 is a diagram for describing the resource assignment operation and downlink weight derivation operation according to the present embodiment. Hereinafter, for subframes #0 to #30 on a time axis and for RBs #0 to #9 on a frequency axis, an operation in which the eNB 100-1 assigns a resource to the UE 200-1 to UE 200-6 will be described.

As shown in FIG. 4, the eNB 100-1 assigns a pair of a PUSCH resource including the RBs #1 to #3 of the subframe #7 and a PDSCH resource including the RBs #1 to #3 of the subframe #9, to the UE 200-1. In addition, the eNB 100-1 calculates downlink weight to be applied to the assigned PDSCH resource on the basis of DMRS of the assigned PUSCH resource, and associates the downlink weight to UE identification information "UE 200-1" and frequency band information "RBs #1 to #3" and stores the downlink weight.

The eNB 100-1 assigns a pair of a PUSCH resource including the RBs #4 and #5 of the subframe #7 and a PDSCH resource including the RBs #4 and #5 of the subframe #9, to the UE 200-2. In addition, the eNB 100-1 calculates downlink weight to be applied to the as signed PDSCH resource on the basis of DMRS of the assigned PUSCH resource, and associates the downlink weight to UE identification information "UE 200-2" and frequency band information "RBs #4 and #5" and stores the downlink weight.

The eNB 100-1 assigns a pair of a PUSCH resource including the RBs #5 to #7 of the subframe #8 and a PDSCH resource including the RBs #5 to #7 of the subframes #10 and #11, to the UE 200-3. In addition, the eNB 100-1 calculates downlink weight to be applied to the assigned PDSCH resource on the basis of DMRS of the assigned PUSCH resource, and associates the downlink weight to UE identification information "UE 200-3" and frequency band information "RBs #5 to #7" and stores the downlink weight.

The eNB 100-1 assigns a pair of a PUSCH resource including the RBs #2 to #4 of the subframe #8 and a PDSCH resource including the RBs #2 to #4 of the subframes #10 and #11, to the UE 200-5. In addition, the eNB 100-1 calculates downlink weight to be applied to the assigned PDSCH resource on the basis of DMRS of the assigned PUSCH resource, and associates the downlink weight to UE identification information "UE 200-5" and frequency band information "RBs #2 to #4" and stores the downlink weight.

Similarly, for the subframes #12 to #16, the eNB 100-1 assigns a resource.

Here, the eNB 100-1 assigns a PUSCH resource including the RBs #0 to #4 of the subframe #17 to the UE 200-6, in response to a PUSCH assignment request from the UE 200-6 in the subframe #11. The PUSCH resource including the RBs #2 and #3 of the subframe #17 is originally a PUSCH resource to be assigned to the UE 200-1, since a PDSCH resource including the RBs #2 and #3 of the subframe #19 is assigned to the UE 200-1.

In this case, the eNB 100-1 searches the stored downlink weight by using the UE identification information "UE 200-1" and frequency band information "RBs #2 and #3" as a search key. As a result, the downlink weight calculated on the basis of the RBs #2 and #3 of the subframe #7 is acquired among the stored downlink weight. Then, the eNB 100-1 applies the acquired downlink weight to the PDSCH resource including the RBs #2 and #3 of the subframe #19.

It is noted that, in the present description of operation, the case where the downlink weight calculated on the basis of DMRS is stored is described. However, downlink weight calculated on the basis of SRS may also be utilized in much the same way as the downlink weight calculated on the basis of DMRS.

(1.3.3) PUSCH Resource Assignment Process Flow

Figure 5:
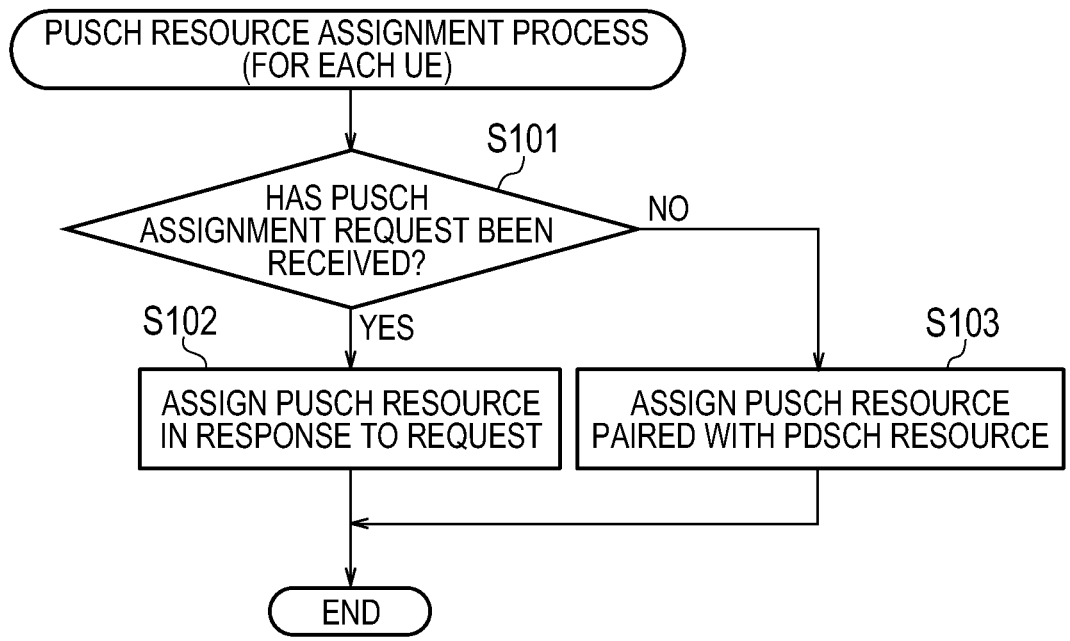
FIG. 5 is a flowchart of the PUSCH resource assignment process flow according to the first embodiment.

Next, by using FIG. 5, a PUSCH resource assignment process flow according to the present embodiment will be described. FIG. 5 is a flowchart of the PUSCH resource assignment process flow according to the present embodiment. The present flow is implemented for each UE 200.

As shown in FIG. 5, in step S101, the resource assignment unit 121 determines whether a PUSCH assignment request from the UE 200 has been received.

In a case where the PUSCH assignment request from the UE 200 has been received (step S101; YES), in step S102, the resource assignment unit 121 assigns a PUSCH resource in response to the PUSCH assignment request.

In a case where the PUSCH assignment request from the UE 200 has not been received (step S101; NO), in step S103, the resource assignment unit 121 assigns a PUSCH resource that overlaps, in frequency band, with the PDSCH resource to be assigned to the UE 200 as a PUSCH resource paired with the PDSCH resource.

(1.3.4) Downlink Weight Derivation Process Flow

Figure 6:
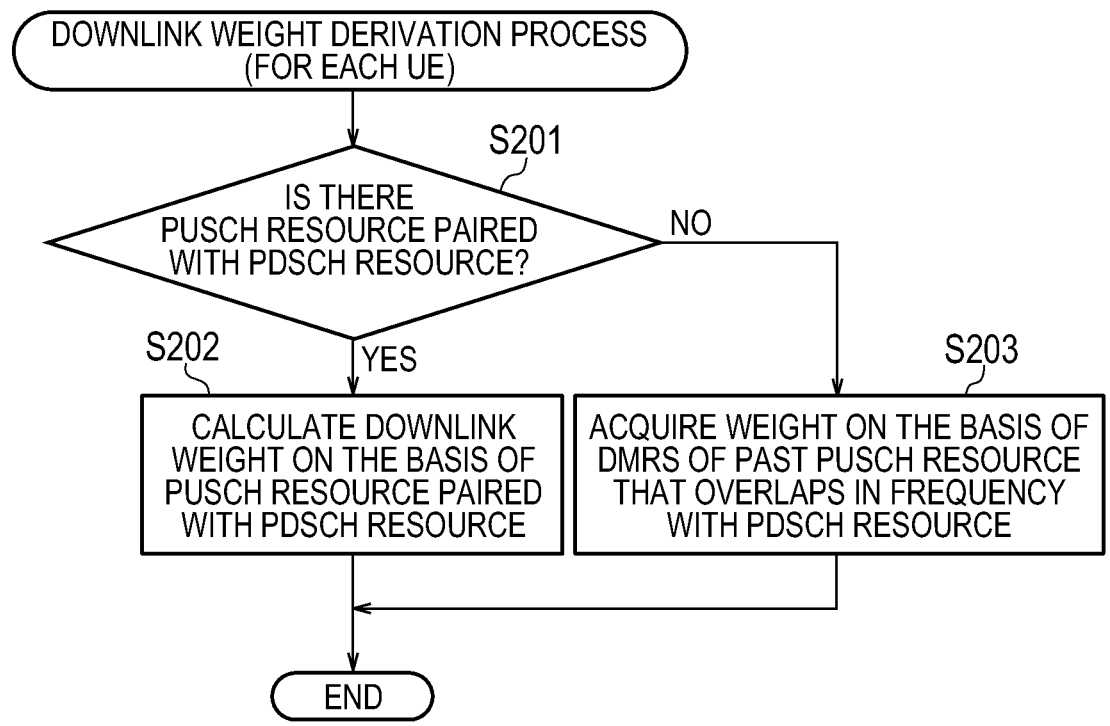
FIG. 6 is a flowchart of the downlink weight derivation process flow according to the first embodiment.

Next, by using FIG. 6, a downlink weight derivation process flow according to the present embodiment will be described. FIG. 6 is a flowchart of the downlink weight derivation process flow according to the present embodiment. The present flow is implemented for each UE 200.

As shown in FIG. 6, in step S201, the weight derivation unit 122 determines whether there is a PUSCH resource of the UE 200 paired with a PDSCH resource to be assigned to the UE 200.

In a case where there is a PUSCH resource of the UE 200 paired with the PDSCH resource to be assigned to the UE 200 (step S201; YES), in step S202, the weight derivation unit 122 calculates the downlink weight on the basis of DMRS of the PUSCH resource constituting the pair.

In a case where there is no PUSCH resource of the UE 200 paired with the PDSCH resource to be assigned to the UE 200 (step S201; NO), in step S203, the weight derivation unit 122 acquires the downlink weight calculated on the basis of the DMRS of the past PUSCH resource of the UE 200 that overlaps, in frequency band, with the PDSCH resource.

(1.4) Conclusion of First Embodiment

As described above, the eNB 100-1 that performs radio communication by using adaptive array control in the TD-LTE system 10 includes, the resource assignment unit 121 that assigns, to the UE 200, a pair of a PDSCH resource and a PUSCH resource that overlaps, in frequency band, with the PDSCH resource, and the weight derivation unit 122 that derives downlink weight to be applied to the PDSCH resource, on the basis of the DMRS transmitted from the UE 200 by using the PUSCH resource. In response to occurrence of necessity to transmit uplink user data by another UE 200, the resource assignment unit 121 changes the assignment of the PUSCH resource to the other UE 200. When the assignment of the PUSCH resource is changed to the other UE 200, the weight derivation unit 122 derives the antenna weight, on the basis of a past DMRS/SRS transmitted from the UE 200 in a past time zone earlier than the PUSCH resource and in a frequency band overlapping with that of the PDSCH resource.

In this way, even in a case where the PUSCH resource, for calculating weight, to be used in the derivation of the antenna weight and the PDSCH resource to which the antenna weight is applied are assigned symmetrically to the UE 200, when transmission of uplink user data from another UE 200 is necessary, the other UE 200 can transmit the uplink user data by changing the assignment of the PUSCH resource for calculating weight to the other UE 200, and thus, it is possible to restrain reduction of uplink throughput. Further, even when the assignment of the PUSCH resource for calculating weight is changed to the other UE 200, it is possible to ensure the accuracy of antenna weight by deriving the antenna weight on the basis of the past DMRS/SRS transmitted from the UE 200 in a past time zone earlier than the PUSCH resource and in a frequency band overlapping with that of the PUSCH resource, and thus, it is possible to enable the adaptive array control to be favorably functioned.

(2) Second Embodiment

Hereinafter, a second embodiment according to the present invention will be described while focusing on the differences from the first embodiment. In the present embodiment, the configurations of the TD-LTE system 10 and the radio frame are similar to those of the first embodiment, but the operation of the eNB 100 is different from that of the first embodiment.

In the present embodiment, two types of PUSCH resources, that is, a PUSCH resource for calculating weight and a data-dedicated PUSCH resource are arranged. Although the PUSCH resource for calculating weight is handled in a similar manner to the PUSCH resource described in the first embodiment, the data-dedicated PUSCH resource is a PUSCH resource dedicated for uplink user data.

(2.1) Resource Assignment Operation and Downlink Weight Derivation Operation

Figure 7:
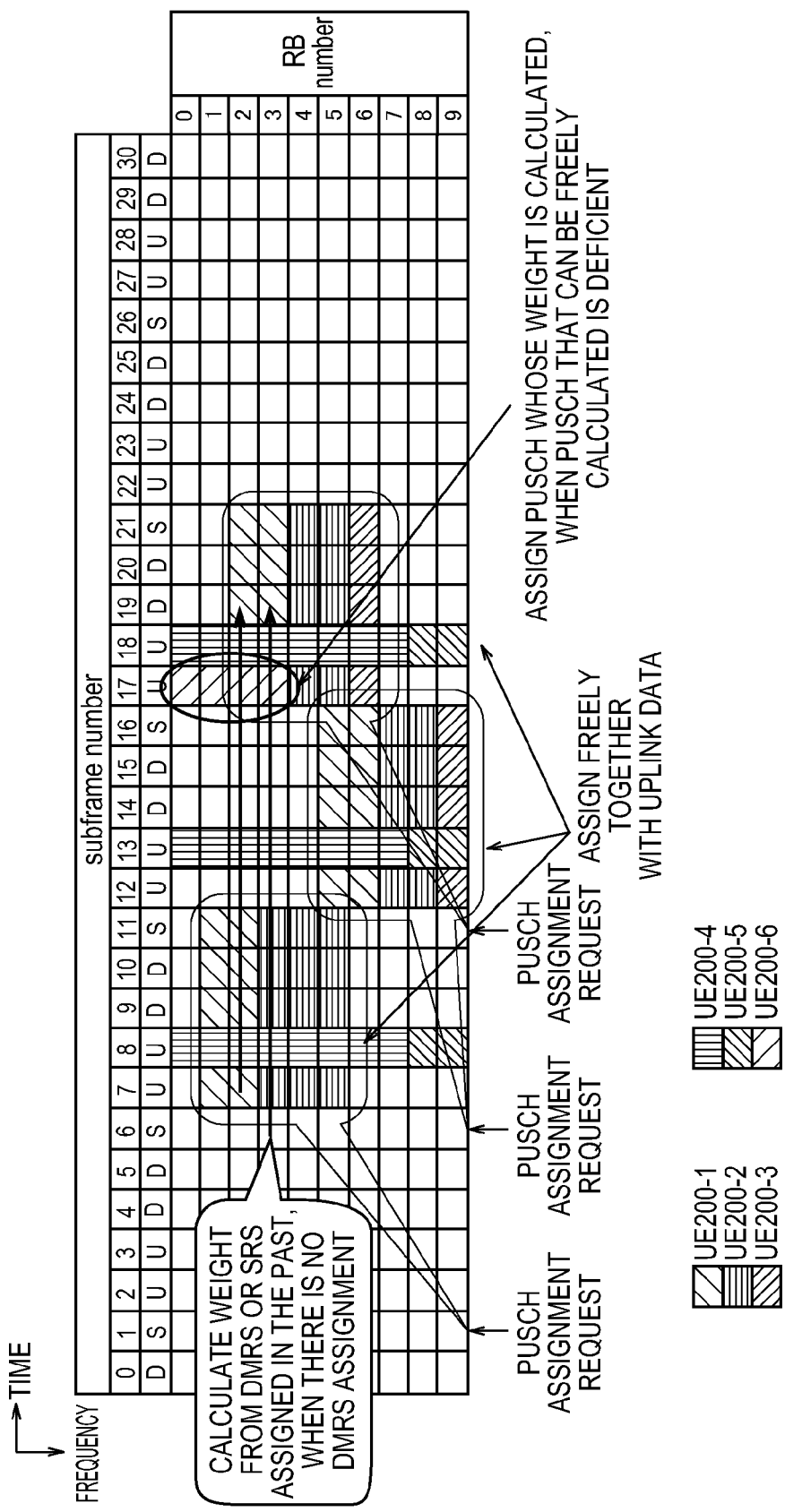
FIG. 7 is a diagram for describing the resource assignment operation and downlink weight derivation operation according to the second embodiment.

Next, by using FIG. 7, a resource assignment operation and a downlink weight derivation operation according to the present embodiment will be described. FIG. 7 is a diagram for describing the resource assignment operation and downlink weight derivation operation according to the present embodiment. Hereinafter, for subframes #0 to #30 on a time axis and for RBs #0 to #9 on a frequency axis, an operation in which the eNB 100-1 assigns a resource to the UE 200-1 to UE 200-6 will be described.

As shown in FIG. 7, the eNB 100-1 uses the RBs included in the respective subframes #8, #13, and #18 as the data-dedicated PUSCH resource.

In particular, the eNB 100-1 assigns a PUSCH resource including the RBs #0 to #7 of the subframe #8 to the UE 200-4, in response to a PUSCH assignment request from the UE 200-4 in the subframe #1. Further, the eNB 100-1 assigns a PUSCH resource including the RBs #8 and #9 of the subframe #8 to the UE 200-5, in response to a PUSCH assignment request from the UE 200-5 in the subframe #1.

The eNB 100-1 assigns a pair of a PUSCH resource including the RBs #1 and #2 of the subframe #7 and a PDSCH resource including the RBs #1 and #2 of the subframes #9 to #11, to the UE 200-1. The eNB 100-1 calculates downlink weight to be applied to the assigned PDSCH resource on the basis of DMRS of the assigned PUSCH resource, and associates the downlink weight to UE identification information "UE 200-1" and frequency band information "RBs #1 and #2" and stores the downlink weight.

In addition, the eNB 100-1 receives SRS from the UE 200-1 in the RB #3 of the subframe #6 and calculates downlink weight on the basis of the SRS. The eNB 100-1 associates the calculated downlink weight to UE identification information "UE 200-1" and frequency band information "RB #3" and stores the downlink weight.

The eNB 100-1 assigns a pair of a PUSCH resource including the RBs #3 to #5 of the subframe #7 and a PDSCH resource including the RBs #3 to #5 of the subframes #9 to #11, to the UE 200-2. The eNB 100-1 calculates downlink weight to be applied to the assigned PDSCH resource on the basis of DMRS of the assigned PUSCH resource, and associates the downlink weight to UE identification information "UE 200-2" and frequency band information "RBs #3 to #5" and stores the downlink weight.

Similarly, for the subframes #12 to #16, the eNB 100-1 assigns a resource.

The eNB 100-1 assigns a PUSCH resource including the RBs #0 to #7 of the subframe #18 to the UE 200-4, in response to a PUSCH assignment request from the UE 200-4 in the subframe #11. Further, the eNB 100-1 assigns a PUSCH resource including the RBs #8 and #9 of the subframe #18 to the UE 200-5, in response to a PUSCH assignment request from the UE 200-5 in the subframe #11.

Further, the eNB 100-1 assigns a PUSCH resource including the RBs #0 to #4 of the subframe #17 to the UE 200-6, in response to a PUSCH assignment request from the UE 200-6 in the subframe #11. In this way, when all the data-dedicated PUSCH resources of the subframe #18 have been assigned, a PUSCH resource for calculating weight is assigned in response to the PUSCH assignment request.

Here, the PUSCH resource including the RBs #2 and #3 of the subframe #17 (PUSCH resource for calculating weight) is originally a PUSCH resource to be assigned to the UE 200-1, since a PDSCH resource including the RBs #2 and #3 of the subframes #19 to #21 is assigned to the UE 200-1.

In this case, the eNB 100-1 searches the stored downlink weight by using the UE identification information "UE 200-1" and frequency band information "RBs #2 and #3" as a search key. As a result, the downlink weight calculated on the basis of the RB #2 of the subframe #7 and the downlink weight calculated on the basis of the RB #3 of the subframe #6 are acquired among the stored downlink weight. Then, the eNB 100-1 applies the acquired downlink weight to the PDSCH resource including the RBs #2 and #3 of the subframes #19 to #21.

(2.2) PUSCH Resource Assignment Process Flow

Figure 8:
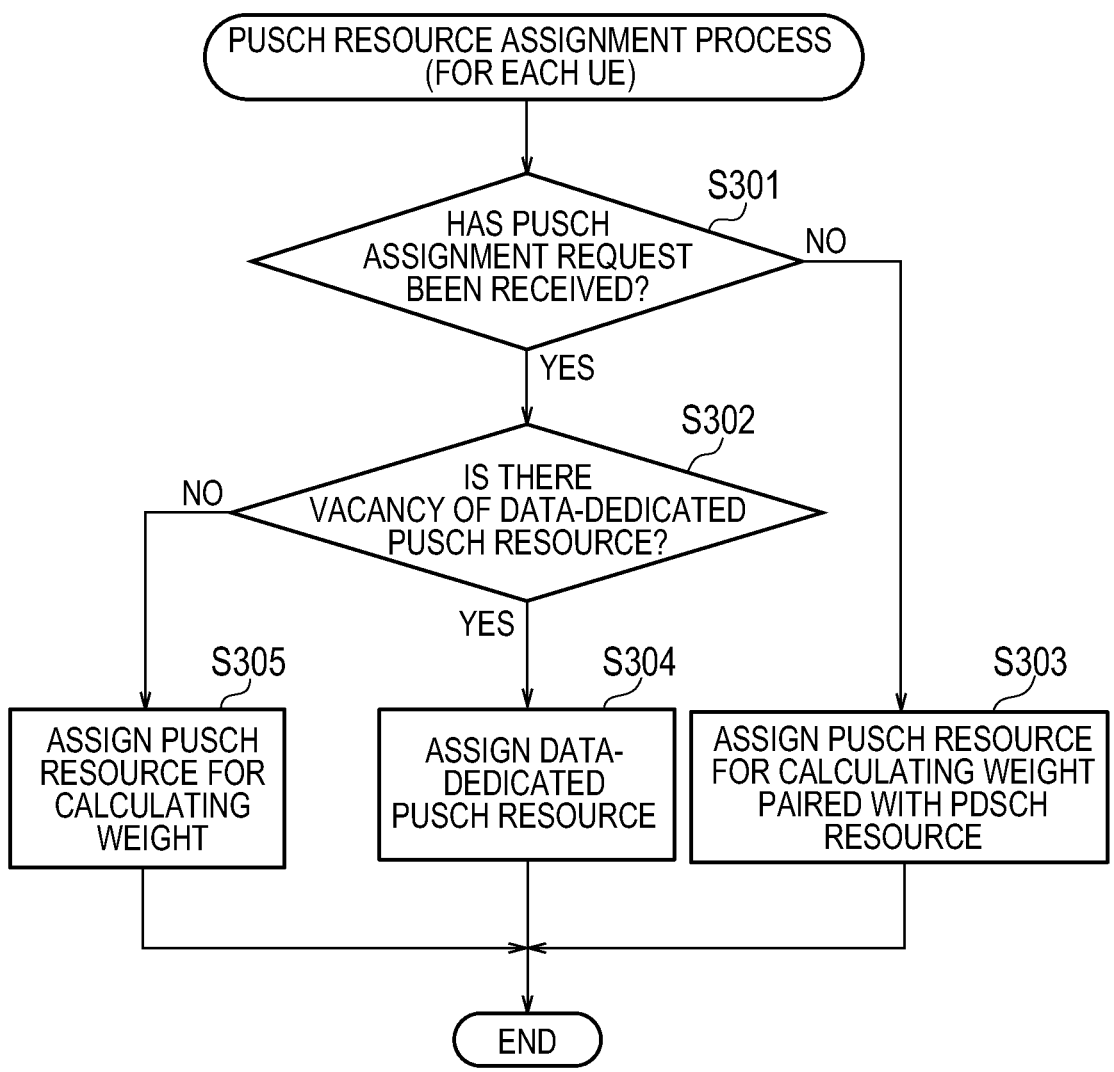
FIG. 8 is a flowchart of the PUSCH resource assignment process flow according to the second embodiment.

Next, by using FIG. 8, a PUSCH resource assignment process flow according to the present embodiment will be described. FIG. 8 is a flowchart of the PUSCH resource assignment process flow according to the present embodiment. The present flow is implemented for each UE 200.

As shown in FIG. 8, in step S301, the resource assignment unit 121 determines whether the PUSCH assignment request from the UE 200 has been received.

In a case where the PUSCH assignment request from the UE 200 has not been received (step S301; NO), in step S303, the resource assignment unit 121 assigns a PUSCH resource that overlaps, in frequency band, with the PDSCH resource to be assigned to the UE 200 as a PUSCH resource paired with the PDSCH resource.

In a case where the PUSCH assignment request from the UE 200 has been received (step S301; YES), in step S302, the resource assignment unit 121 determines whether there is a vacancy of the data-dedicated PUSCH resource.

In a case where there is a vacancy of the data-dedicated PUSCH resource (step S302; YES), in step S304, the resource assignment unit 121 assigns a data-dedicated PUSCH resource in response to the PUSCH assignment request.

In a case where there is no vacancy of the data-dedicated PUSCH resource (step S302; NO), in step S305, the resource assignment unit 121 assigns a PUSCH resource for calculating weight in response to the PUSCH assignment request.

(2.3) Conclusion of Second Embodiment

As described above, in the present embodiment, the resource assignment unit 121 can assign the data-dedicated PUSCH resource dedicated for uplink user data. In this way, it is possible to avoid a situation where all the uplink radio resources are consumed for deriving antenna weight by separately arranging the data-dedicated PUSCH resource dedicated for uplink user data, and thus, it is possible to restrain reduction of uplink throughput.

In the present embodiment, the resource assignment unit 121 changes the assignment of the PUSCH resource for calculating weight from the UE 200 to another UE 200, when all the data-dedicated PUSCH resources have been assigned and when it becomes necessary to transmit uplink user data by the other UE 200. In this way, only when all the data-dedicated PUSCH resources have been assigned and it becomes necessary to transmit uplink user data by the other UE 200, by changing the assignment of the PUSCH resource for calculating weight to the other UE 200, it is possible to reserve the PUSCH resource for calculating weight to the utmost. Thus, it is possible to enable the adaptive array control to be favorably functioned.

(3) Third Embodiment

Hereinafter, a third embodiment according to the present invention will be described while focusing on the differences from the first embodiment. In the present embodiment, the configurations of the TD-LTE system 10 and the radio frame are similar to those of the first embodiment, but the operation of the eNB 100 is different from that of the first embodiment.

(3.1) Downlink Weight Derivation Process Flow

Figure 9:
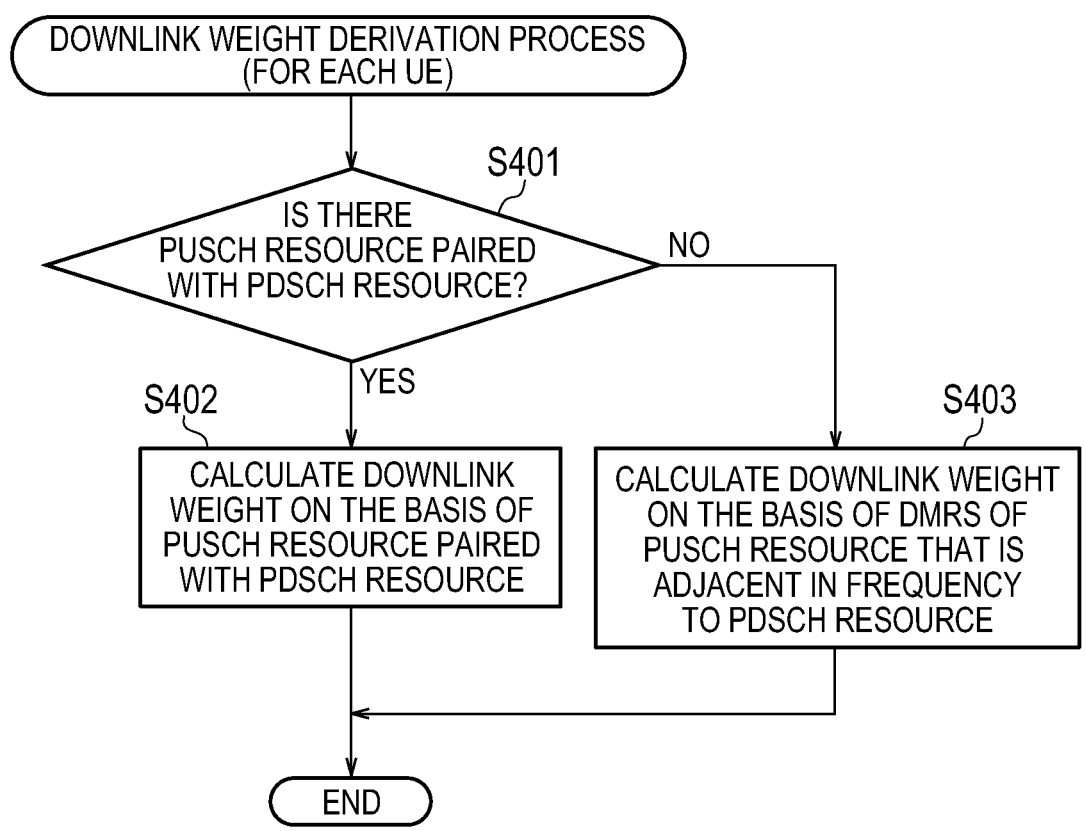
FIG. 9 is a flowchart of the downlink weight derivation process flow according to the third embodiment.

Next, by using FIG. 9, a downlink weight derivation process flow according to the present embodiment will be described. FIG. 9 is a flowchart of the downlink weight derivation process flow according to the present embodiment. The present flow is implemented for each UE 200.

As shown in FIG. 9, in step S401, the weight derivation unit 122 determines whether there is a PUSCH resource of the UE 200 paired with a PDSCH resource to be assigned to the UE 200.

In a case where there is a PUSCH resource of the UE 200 paired with the PDSCH resource to be assigned to the UE 200 (step S401; YES), in step S402, the weight derivation unit 122 calculates the downlink weight on the basis of DMRS of the PUSCH resource constituting the pair.

In a case where there is no PUSCH resource of the UE 200 paired with the PDSCH resource to be assigned to the UE 200 (step S401; NO), in step S403, the weight derivation unit 122 calculates downlink weight on the basis of DMRS of a PUSCH resource that is adjacent in frequency band to the PDSCH resource and in the same time zone (the same subframe) as the PUSCH resource.

(3.2) Conclusion of Third Embodiment

As described above, when the assignment of the PUSCH resource paired with the PDSCH resource is changed to another UE 200, the weight derivation unit 122 calculates the antenna weight on the basis of the neighboring DMRS transmitted from the UE 200 in a time zone of the PUSCH resource and in a frequency band adjacent to that of the PDSCH resource. In this way, even when the assignment of the PUSCH resource constituting the pair is changed to another UE 200, it is possible to ensure the accuracy of antenna weight by calculating the antenna weight on the basis of the neighboring DMRS, and thus, it is possible to enable the adaptive array control to be favorably functioned.

(4) Fourth Embodiment

Hereinafter, a fourth embodiment according to the present invention will be described while focusing on the differences from the first embodiment.

(4.1) Configuration of Radio Base Station

Figure 10:
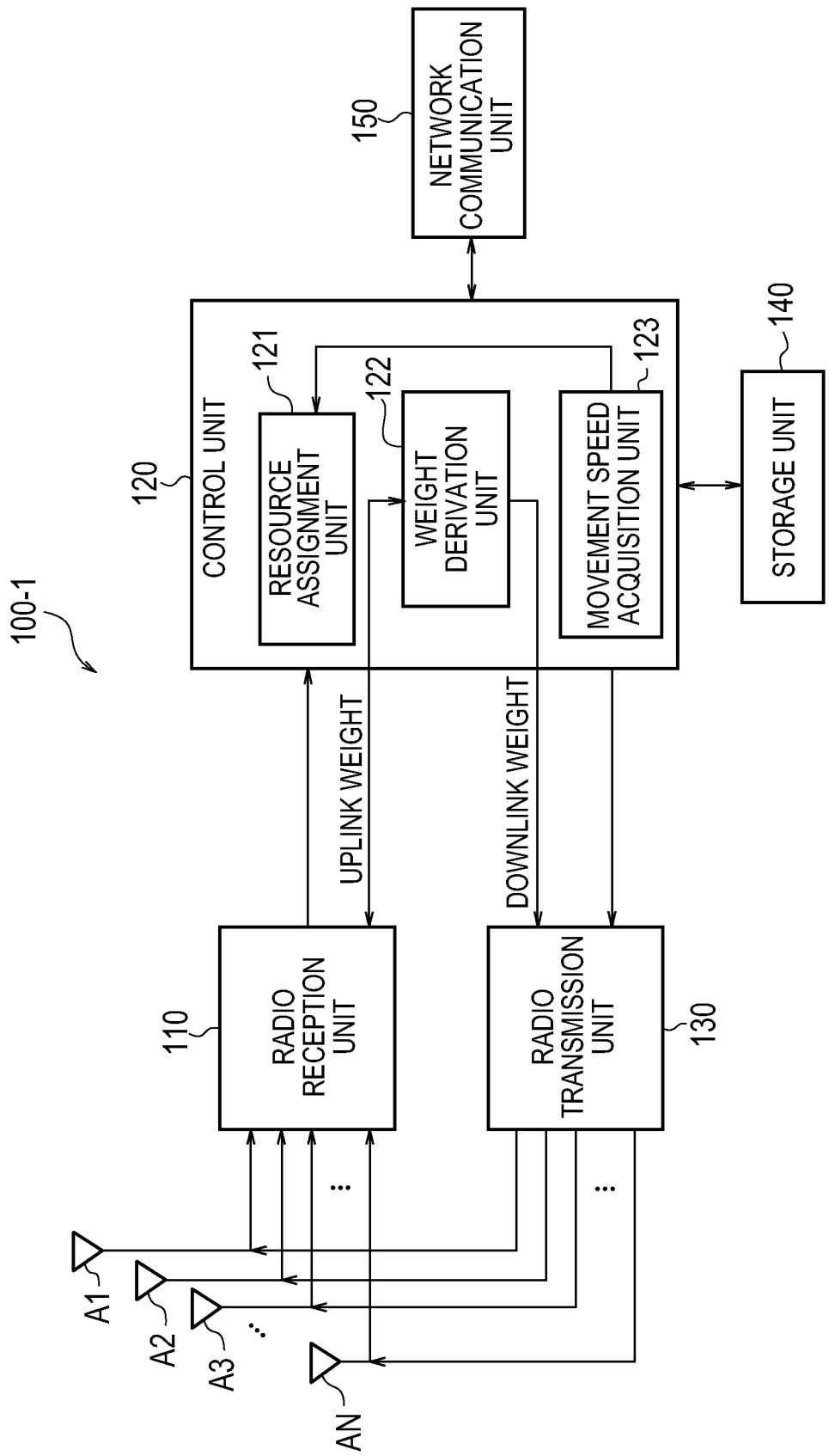
FIG. 10 is a block diagram of the eNB according to the fourth embodiment.

FIG. 10 is a block diagram of the eNB 100-1 according to the present embodiment. As shown in FIG. 10, the eNB 100-1 in the present embodiment is different from the first embodiment in that the eNB 100-1 in the present embodiment further includes a movement speed acquisition unit 123 that acquires information related to movement speed of the UE 200. For example, the information related to movement speed is a measurement value of Doppler frequency between the eNB 100-1 and the UE 200. Alternatively, when the UE 200 has a GPS, movement speed information that can be obtained by using the GPS may be used.

(4.2) Downlink Weight Derivation Process Flow

Figure 11:
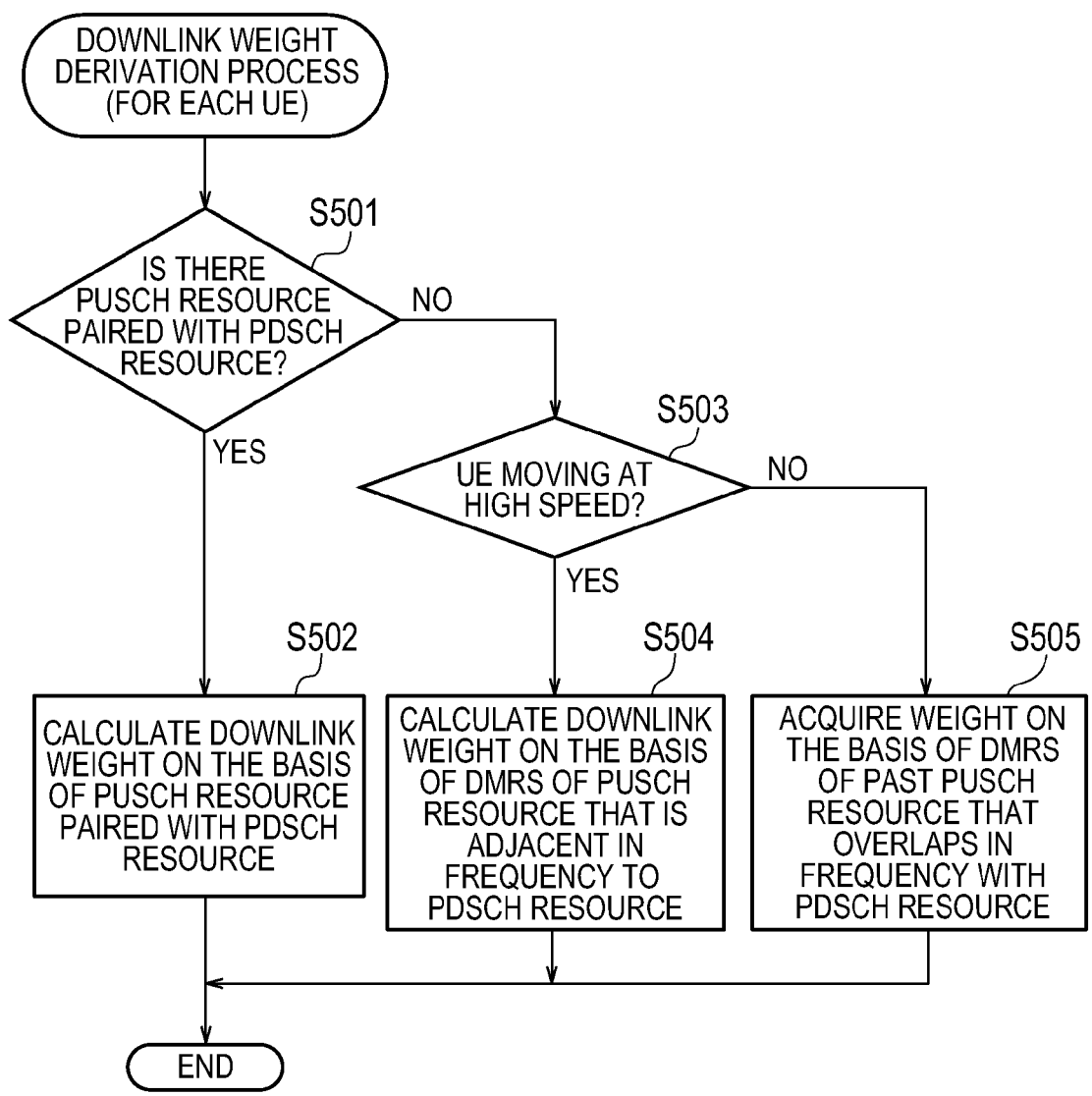
FIG. 11 is a flowchart of the downlink weight derivation process flow according to the fourth embodiment.

Next, by using FIG. 11, a downlink weight derivation process flow according to the present embodiment will be described. FIG. 11 is a flowchart of the downlink weight derivation process flow according to the present embodiment. The present flow is implemented for each UE 200.

As shown in FIG. 11, in step S501, the weight derivation unit 122 determines whether there is a PUSCH resource of the UE 200 paired with a PDSCH resource to be assigned to the UE 200.

In a case where there is a PUSCH resource of the UE 200 paired with the PDSCH resource to be assigned to the UE 200 (step S501; YES), in step S502, the weight derivation unit 122 calculates the downlink weight on the basis of DMRS of the PUSCH resource constituting the pair.

In a case where there is no PUSCH resource of the UE 200 paired with the PDSCH resource to be assigned to the UE 200 (step S501; NO), in step S503, the weight derivation unit 122 determines whether the UE 200 is moving at high speed. For example, the weight derivation unit 122 determines whether the UE 200 is moving at high speed by comparison between a measurement value of Doppler frequency, between the eNB 100-1 and the UE 200, and a threshold value.

In a case where it is determined that the UE 200 is moving at high speed (step S503; YES), in step S504, the weight derivation unit 122 calculates downlink weight on the basis of DMRS (neighboring DMRS) of a PUSCH resource that is adjacent in frequency band to the PDSCH resource and in the same time zone (the same subframe) as the PUSCH resource.

In a case where it is determined that the UE 200 is not moving at high speed (step S503; NO), in step S505, the weight derivation unit 122 acquires the downlink weight calculated on the basis of the DMRS or SRS of the past PUSCH resource of the UE 200 that overlaps, in frequency band, with the PDSCH resource.

(4.3) Conclusion of Fourth Embodiment

As described above, in the present embodiment, when the assignment of the PUSCH resource is changed to another UE 200 and when it is assumed that the movement speed of the UE 200 is high, the weight derivation unit 122 derives the antenna weight on the basis of the neighboring DMRS. In this way, in a case where the movement speed of the UE 200 is high, if the antenna weight is derived on the basis of the past DMRS/SRS, the accuracy of antenna weight becomes low. Thus, it is possible to ensure the accuracy of antenna weight by deriving the antenna weight on the basis of the neighboring DMRS, and thus, it is possible to enable the adaptive array control to be favorably functioned.

(5) Fifth Embodiment

Hereinafter, a fifth embodiment according to the present invention will be described while focusing on the differences from the first embodiment.

(5.1) Configuration of Radio Base Station

Figure 12:
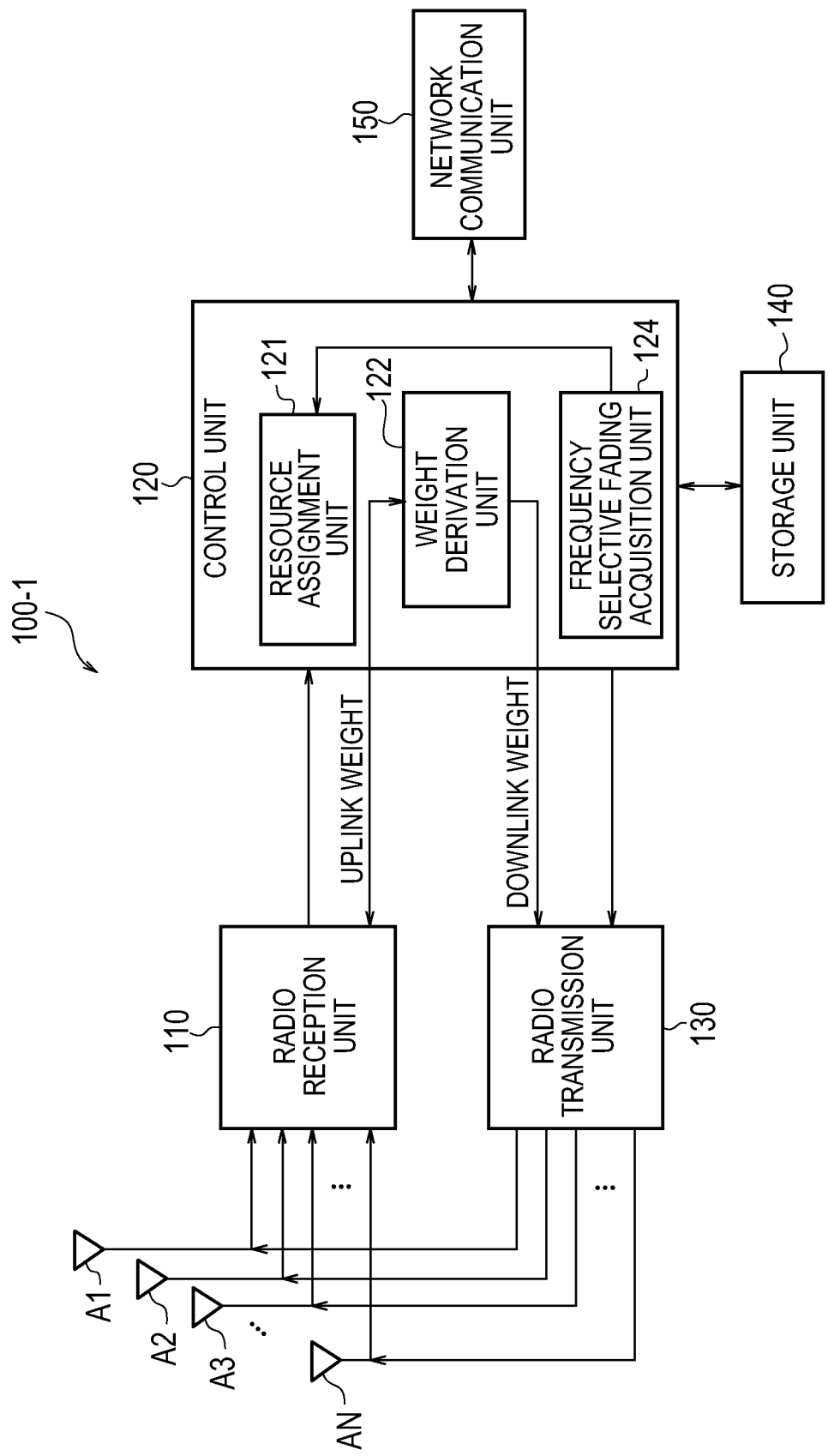
FIG. 12 is a block diagram of the eNB according to the fifth embodiment.

FIG. 12 is a block diagram of the eNB 100-1 according to the present embodiment. As shown in FIG. 12, in the present embodiment, the eNB 100-1 is different from the first embodiment in that the eNB 100-1 in the present embodiment further includes a frequency selective fading acquisition unit 124 that acquires information related to frequency selective fading between the UE 200 and the eNB 100-1.

(5.2) Downlink Weight Derivation Process Flow

Figure 13:
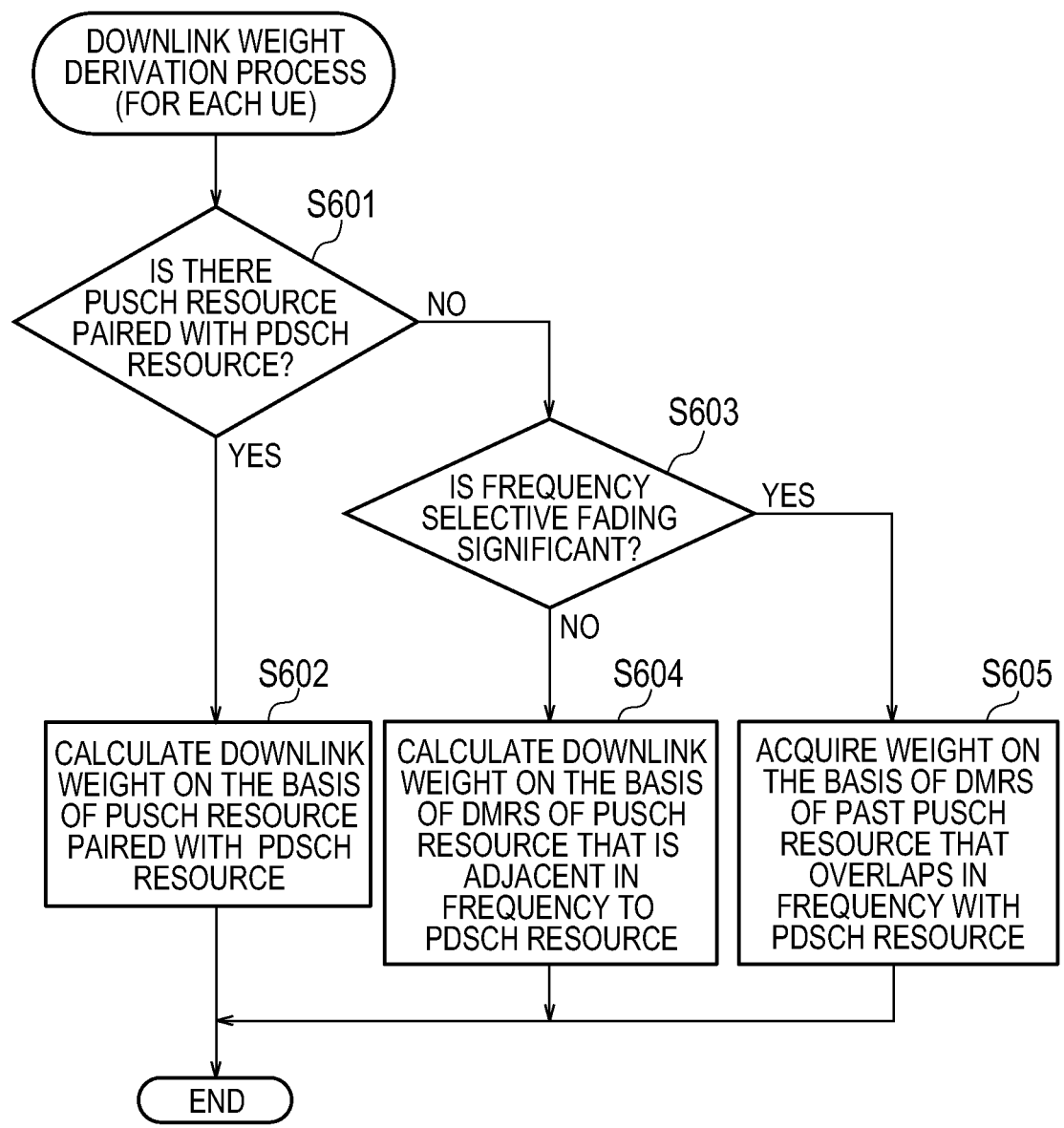
FIG. 13 is a flowchart of the downlink weight derivation process flow according to the fifth embodiment.

Next, by using FIG. 13, a downlink weight derivation process flow according to the present embodiment will be described. FIG. 13 is a flowchart of the downlink weight derivation process flow according to the present embodiment. The present flow is implemented for each UE 200.

As shown in FIG. 13, in step S601, the weight derivation unit 122 determines whether there is a PUSCH resource of the UE 200 paired with a PDSCH resource to be assigned to the UE 200.

In a case where there is a PUSCH resource of the UE 200 paired with the PDSCH resource to be assigned to the UE 200 (step S601; YES), in step S602, the weight derivation unit 122 calculates the downlink weight on the basis of DMRS of the PUSCH resource constituting the pair.

In a case where there is no PUSCH resource of the UE 200 paired with the PDSCH resource to be assigned to the UE 200

(step S601; NO), in step S603, the weight derivation unit 122 determines whether the frequency selective fading between the UE 200 and the eNB 100-1 is significant. For example, the weight derivation unit 122 determines whether the frequency selective fading between the UE 200 and the eNB 100-1 is significant by comparison between a measurement value of frequency selective fading between the UE 200 and the eNB 100-1, and a threshold value.

In a case where it is determined that the frequency selective fading between the UE 200 and the eNB 100-1 is significant (step S603; YES), in step S605, the weight derivation unit 122 acquires the downlink weight calculated on the basis of the DMRS or SRS of the past PUSCH resource of the UE 200 that overlaps, in frequency band, with the PDSCH resource.

In a case where it is determined that the frequency selective fading between the UE 200 and the eNB 100-1 is not significant (step S603; NO), in step S604, the weight derivation unit 122 calculates downlink weight on the basis of DMRS (neighboring DMRS) of a PUSCH resource that is adjacent in frequency band to the PUSCH resource and in the same time zone (the same subframe) as the PUSCH resource.

(5.3) Conclusion of Fifth Embodiment

As described above, in the present embodiment, when the assignment of the PUSCH resource for calculating weight is changed to another UE 200 and when it is assumed that the frequency selective fading between the UE 200 and the eNB 100-1 is significant, the weight derivation unit 122 derives the antenna weight on the basis of the past DMRS/SRS. In this way, in a case where the frequency selective fading between the UE 200 and the eNB 100-1 is significant, if the antenna weight is derived on the basis of the neighboring DMRS, the accuracy of antenna weight becomes low. Thus, it is possible to ensure the accuracy of antenna weight by deriving the antenna weight on the basis of the past DMRS/SRS, and thus, it is possible to enable the adaptive array control to be favorably functioned.

(6) Other Embodiment

As described above, the present invention has been described according to the embodiment. It must not be understood that, however, the discussions and the drawings constituting a part of this disclosure limit the present invention. From this disclosure, various alternative embodiments, examples and operational techniques are apparent to those skilled in the art.

In the above-described embodiment, the description is given of the example where the present invention is applied to the TD-LTE system 10; however, the present invention may be applied to another system adopting the TDD scheme and the adaptive array control.

Note that the entire content of the Japanese Patent Application No. 2011-163736 (filed on Jul. 26, 2011) is incorporated herein by reference.

INDUSTRIAL APPLICABILITY

As mentioned above, the present invention is useful in radio communication such as mobile communication, with which it is possible to enable adaptive array control to be favorably functioned while restraining reduction of uplink throughput in a TDD radio communication system.

The invention claimed is:

1. A radio base station that performs radio communication by using adaptive array control, in a TDD radio communication system, comprising:
    a resource assignment unit that assigns, to a radio terminal, a pair of a downlink radio resource and an uplink radio resource that overlaps, in frequency band, with the downlink radio resource; and
    a weight derivation unit that derives antenna weight that should be applied to the downlink radio resource, on the basis of an uplink reference signal transmitted from the radio terminal by using the uplink radio resource, wherein
    the resource assignment unit changes the assignment of the uplink radio resource constituting the pair used for adaptive array control to another radio terminal in response to request for an uplink user data resource from the another radio terminal, and
    when the assignment of the uplink radio resource constituting the pair is changed to the another radio terminal, the weight derivation unit derives the antenna weight, on the basis of a neighboring uplink reference signal used for adaptive array control transmitted from the radio terminal in a time slot of the previously assigned uplink radio resource constituting the pair and in another frequency band adjacent to the frequency band of the downlink radio resource.

2. The radio base station according to claim 1, wherein the resource assignment unit further can assign a data-dedicated uplink radio resource dedicated to uplink data.

3. The radio base station according to claim 2, wherein the resource assignment unit changes the assignment of the uplink radio resource constituting the pair to the another radio terminal, when all the data-dedicated uplink radio resources have been assigned and when it becomes necessary to transmit uplink data by the another radio terminal.

4. The radio base station according to claim 1, further comprising a movement speed acquisition unit that acquires information related to movement speed of the radio terminal, wherein
    when the assignment of the uplink radio resource constituting the pair is changed to the another radio terminal and when it is assumed that the movement speed of the radio terminal is higher than a predetermined threshold, the weight derivation unit derives the antenna weight on the basis of the neighboring uplink reference signal.

5. The radio base station according to claim 1, further comprising a frequency selective fading acquisition unit that acquires information related to frequency selective fading between the radio terminal and the radio base station, wherein
    when the assignment of the uplink radio resource constituting the pair is changed to the another radio terminal and when it is assumed that the frequency selective fading between the radio terminal and the radio base station is significant, the weight derivation unit derives the antenna weight on the basis of the past uplink reference signal.

6. A communication control method in a radio base station that performs radio communication by using adaptive array control, in a TDD radio communication system, comprising:
    a resource assignment step of assigning, to a radio terminal, a pair of a downlink radio resource and an uplink radio resource that overlaps, in frequency band, with the downlink radio resource; and
    a weight derivation step of deriving antenna weight that should be applied to the downlink radio resource, on the basis of an uplink reference signal transmitted from the radio terminal by using the uplink radio resource, wherein in the resource assignment step, the radio base station changes the assignment of the uplink radio resource constituting the pair used for adaptive array control to another radio terminal in response to request for an uplink user data resource from the other radio terminal, and when the radio base station changes the assignment of the uplink radio resource constituting the pair to the another radio terminal, in the weight derivation step, the radio base station derives the antenna weight, on the basis of a neighboring uplink reference signal used for adaptive array control transmitted from the radio terminal in a time slot of the previously assigned uplink radio resource constituting the pair and in another frequency band adjacent to the frequency band of the downlink radio resource.

7. A radio base station that performs radio communication by using adaptive array control, in a TDD radio communication system, comprising:

a resource assignment unit that assigns, to a radio terminal, a pair of a downlink radio resource and an uplink radio resource that overlaps, in frequency band, with the downlink radio resource; and a weight derivation unit that derives antenna weight that should be applied to the downlink radio resource, on the basis of an uplink reference signal transmitted from the radio terminal by using the uplink radio resource, wherein the resource assignment unit changes the assignment of the uplink radio resource constituting the pair to another radio terminal in response to a request for an uplink user data resource from the another radio terminal, the weight derivation unit determines whether there is the uplink radio resource of the radio terminal paired with the downlink radio resource to be assigned to the radio terminal, and when there is no uplink radio resource constituting the pair, the weight derivation unit derives the antenna weight, on the basis of a neighboring uplink reference signal used for adaptive array control transmitted from the radio terminal in a time slot of the previously assigned uplink radio resource constituting the pair and in another frequency band adjacent to the frequency band of the downlink radio resource.

* * * * *